US012476355B2

(12) United States Patent
Thippur Shivamurthy et al.

(10) Patent No.: US 12,476,355 B2
(45) Date of Patent: Nov. 18, 2025

(54) SYSTEM

(71) Applicant: NXP B.V., Eindhoven (NL)

(72) Inventors: Harshitha Thippur Shivamurthy, Eindhoven (NL); Rabia Syeda, Eindhoven (NL); Rocío Gabriela Molina Moreno, Eindhoven (NL); Cristine Aguila Badiao, Eindhoven (NL); Pieter Lok, Leur (NL); Adrianus Buijsman, Nijmegen (NL); Leo van Gemert, Nijmegen (NL); Maarten Lont, Eindhoven (NL); Giorgio Carluccio, Eindhoven (NL); Antonius Johannes Matheus de Graauw, Haelen (NL)

(73) Assignee: NXP B.V., Eindhoven (NL)

( * ) Notice: Subject to any disclaimer, the term of this patent is extended or adjusted under 35 U.S.C. 154(b) by 127 days.

(21) Appl. No.: 18/496,975

(22) Filed: Oct. 30, 2023

(65) Prior Publication Data

US 2024/0154300 A1 May 9, 2024

(30) Foreign Application Priority Data

Nov. 4, 2022 (EP) .................................... 22205603

(51) Int. Cl.

| | |
|---|---|
| ***H01Q 1/38*** | (2006.01) |
| ***H01Q 1/22*** | (2006.01) |
| ***H01Q 21/24*** | (2006.01) |
| ***H01Q 21/29*** | (2006.01) |

(52) U.S. Cl.

CPC ............. *H01Q 1/38* (2013.01); *H01Q 1/2283* (2013.01)

(58) Field of Classification Search

CPC ........ H01Q 21/24; H01Q 1/246; H01Q 21/29; H01Q 1/48; H01Q 21/062; H01Q 25/005

See application file for complete search history.

(56) References Cited

U.S. PATENT DOCUMENTS

| | | | |
|---|---|---|---|
| 9,136,230 | B2 | 9/2015 | Demin et al. |
| 9,435,842 | B2 | 9/2016 | Vaucher et al. |
| 9,583,811 | B2 | 2/2017 | Seler et al. |
| 10,164,318 | B2 | 12/2018 | Seok et al. |
| 10,522,895 | B2 | 12/2019 | Blech et al. |

(Continued)

FOREIGN PATENT DOCUMENTS

| | | |
|---|---|---|
| CN | 110690179 A | 1/2020 |

*Primary Examiner* — Wei (Victor) Y Chan

(57) ABSTRACT

A system comprising: a waveguide assembly comprising a plurality of waveguides, the plurality of waveguides comprising at least a first waveguide and a second waveguide, and an integrated circuit package, IC package, comprising a plurality of launchers to one or more of transmit signalling to and receive signalling from a respective one of the plurality of waveguides, wherein the waveguide assembly comprises a surface configured to be coupled to the IC package and each of the plurality of waveguides comprises an opening in the surface configured to be aligned with its respective launcher, and wherein each of the openings has a major dimension and a minor dimension, wherein the major dimension is larger than the minor dimension, and wherein the major dimension of at least the opening of the first waveguide is oriented perpendicular to the major dimension of the opening of the second waveguide.

18 Claims, 4 Drawing Sheets

(56) References Cited

U.S. PATENT DOCUMENTS

| | | | | |
|---|---|---|---|---|
| 10,638,268 | B2 * | 4/2020 | Xing | G01S 5/14 |
| 10,692,824 | B2 | 6/2020 | Lachner et al. | |
| 10,893,390 | B2 * | 1/2021 | Lee | H04W 4/40 |
| 11,196,146 | B2 | 12/2021 | Moallem et al. | |
| 11,301,542 | B2 | 4/2022 | Bekooij | |
| 11,380,634 | B2 | 7/2022 | De Graauw et al. | |
| 2015/0364830 | A1 | 12/2015 | Tong et al. | |
| 2016/0079672 | A1 * | 3/2016 | Cerreno | H01Q 21/065 343/848 |
| 2017/0141471 | A1 * | 5/2017 | Taachouche | H01Q 9/0457 |
| 2018/0299488 | A1 * | 10/2018 | Jordan | H01Q 1/38 |
| 2019/0044211 | A1 * | 2/2019 | Drouin | H01P 5/02 |
| 2019/0356057 | A1 * | 11/2019 | Carey | H01Q 1/241 |
| 2020/0067167 | A1 * | 2/2020 | Izadian | H01P 1/222 |
| 2020/0168974 | A1 | 5/2020 | Vosoogh | |
| 2021/0218125 | A1 * | 7/2021 | Ali | H01Q 1/38 |
| 2022/0189894 | A1 | 6/2022 | Zanati et al. | |
| 2024/0162629 | A1 * | 5/2024 | Li | H01Q 19/22 |

* cited by examiner

SYSTEM

CROSS-REFERENCE TO RELATED APPLICATIONS

This application claims the priority under 35 U.S.C. § 119 of European Patent application no. 22205603.8, filed on 4 Nov. 2022, the contents of which are incorporated by reference herein.

FIELD

The present disclosure relates to a system, and, in particular, a system including an integrated circuit package and a waveguide assembly. It also relates to an electronic device comprising said system.

BACKGROUND

A launcher in package configuration comprises one or more waveguide launchers or waveguide couplers integrated into a package comprising one or more integrated circuits. A waveguide may be used to route electromagnetic radiation to and/or from the waveguide launcher(s) or waveguide coupler(s).

SUMMARY

According to a first aspect of the present disclosure there is provided a system comprising:

- a waveguide assembly comprising a plurality of waveguides, the plurality of waveguides comprising at least a first waveguide and a second waveguide, and
- an integrated circuit package, IC package, comprising a plurality of launchers to one or more of transmit signalling to and receive signalling from a respective one of the plurality of waveguides,
- wherein the waveguide assembly comprises a surface configured to be located adjacent the IC package and wherein each of the plurality of waveguides comprise an opening in the surface configured to be aligned with its respective launcher, and
- wherein each of the openings has a major dimension and a minor dimension, wherein the major dimension is larger than the minor dimension, and
- wherein the major dimension of at least the opening of the first waveguide is oriented perpendicular to the major dimension of the opening of the second waveguide.

In one or more embodiments each of the plurality of launchers has a major dimension and a minor dimension, wherein the major dimension is larger than the minor dimension, and wherein each launcher and the opening of its respective one of the plurality of waveguides is arranged such that the major dimension of the opening is parallel to the major dimension of the launcher.

In one or more embodiments each of the plurality of launchers comprises a differential patch launcher and the major dimension comprises a length of the differential patch launcher and the minor dimension comprises a width of the differential patch launcher.

In one or more embodiments each opening of the first waveguide and the second waveguide has a rectangular cross section.

In one or more embodiments each opening of the first waveguide and the second waveguide has a rectangular cross section having rounded corners.

In one or more examples each opening of the first waveguide and the second waveguide has an oval cross section.

In one or more embodiments each opening of the first waveguide and the second waveguide has a dog-bone shaped cross section.

In one or more examples, the dog-bone shaped cross section may comprise an elongate shape having parallel sides in a middle section and at each end of the elongate shape a second section of greater width than the middle section.

In one or more embodiments the first waveguide is spaced apart from the second waveguide by at least a first predetermined distance comprising at least 1 mm.

In one or more embodiments the waveguide assembly comprises a substrate wherein the plurality of waveguides comprise channels that extend through the substrate.

In one or more embodiments the IC package is configured to provide for transmission of signalling via the first waveguide and receipt of signalling via the second waveguide, and wherein the first waveguide and its respective launcher and the second waveguide and its respective launcher are arranged on opposite sides of the waveguide assembly and IC package respectively.

In one or more embodiments the plurality of waveguides are configured such that:

- waveguides of the plurality of waveguides that are arranged with their major dimensions perpendicular to one another are spaced apart by a first minimum spacing; and
- waveguides of the plurality of waveguides that are arranged with their major dimensions parallel to one another are spaced apart by a second minimum spacing;
- wherein the first minimum spacing is smaller than the second minimum spacing.

In one or more embodiments each of the launchers comprise a differential patch launcher comprising a planar body having a slot therein extending from an outer edge along a line of symmetry of the planar body, wherein a differential microstrip line comprising a first line and a second line are coupled to the planar body at opposite sides of the slot.

In one or more embodiments at least one of the first line or the second line of the microstrip line comprises a compensation component configured to provide for common mode reduction.

In one or more examples the microstrip line is rotated about 90 degrees from the output of the IC die to the input to the launcher.

In one or more examples the compensation component is a balun.

In one or more embodiments the differential patch launcher is shaped such that a predetermined location on the differential patch launcher is at ground potential when in use and wherein the system comprises a detector coupled to said differential patch launcher at the predetermined location, wherein the detector is configured to detect current flow in said connection and, based on detection of said current flow, provide a signal.

In one or more embodiments the system includes an interface layer configured to extend between the surface of the waveguide assembly and the IC package, wherein the interface layer may comprise one of:

- a conductive material with openings corresponding to each of the plurality of openings in the plurality of waveguides, and
- an electromagnetic band-gap structure around each of the plurality of openings in the plurality of waveguides.

According to a second aspect of the present disclosure there is provided an electronic device comprising one of a telecommunication radio interface and a radar system, including the system.

In one or more examples, said IC package comprises one of: a bottom coupling flip-chip-chip-scale-package platform, FC-CSP; a top coupling flip-chip-chip-scale-package pos-sum platform; and top or bottom coupling fan-out-wafer-level-package, FO-WLP.

According to a second aspect of the present disclosure there is provided an electronic device comprising one of a telecommunication radio interface and a radar system, such as an automotive radar system, including the system.

Thus, in an (e.g., automotive) radar system, the system may be configured to transmit the radar signals and/or receive the reflected radar signals via waveguides in the waveguide assembly. In a telecommunication radio interface, the package may be configured to send and/or receive signals to enable communication between a mobile telephone and a base station.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Examples of the present application relate to a launcher in package. A launcher in package comprises an integrated circuit package that includes an integrated circuit in a die as well as a launcher integrated within the package. In one or more examples, a further substrate may be provided within the package and the launcher may be located within the further substrate. In such an example, the launcher may be electrically coupled to the integrated circuit for the transmission and/or receipt of signalling.

In some examples, a plurality of launchers may be provided in the package. As the complexity of systems increase and there is further miniaturization/integration to realize improved performance and low-cost applications, interference between the signals transmitted/received by the launchers increases.

In one or more of the example embodiments described herein, the system is designed to provide improved isolation between waveguides that convey different RF channels whilst maintaining and preferably reducing the size of the overall launcher in package system.

Figure 1:
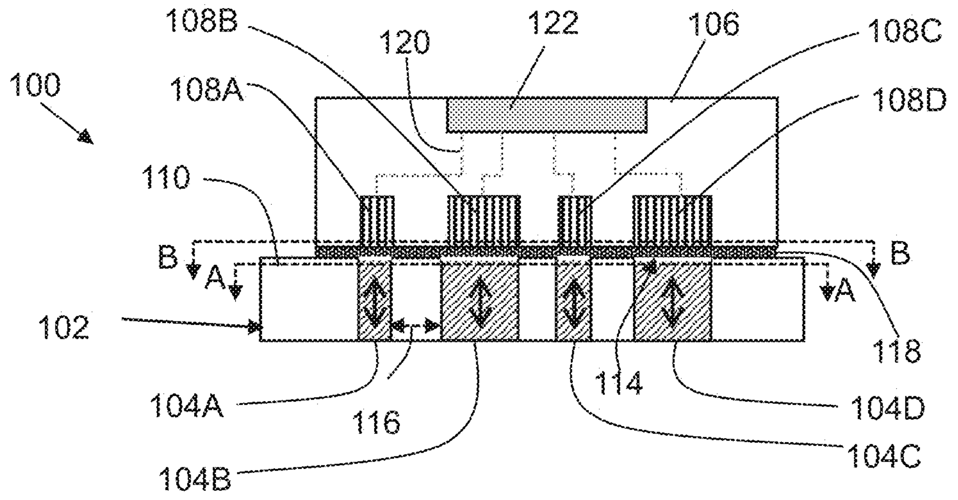
FIG. 1 shows a side view of an example embodiment of a system comprising a waveguide assembly and an integrated circuit package comprising a plurality of launchers.

Example FIG. 1 show a system 100 comprising a waveguide assembly 102 comprising a plurality of waveguides 104A-D and an integrated circuit (IC) package 106. The IC package 106 comprises a plurality of launchers 108A-D. Thus, the IC package comprises a launcher in package arrangement. The IC package further comprises an integrated circuit die 122. The signalling for transmitting by the launchers may be generated by circuitry of the integrated circuit die 122. The signalling received by the launchers may be provided to the circuitry of the integrated circuit die 122 for processing.

A launcher in package arrangement can provide for a number of advantages such as reducing the overall footprint as well as reducing the insertion loss from the package 106 to an antenna and vice versa. The launcher in package arrangement can enable effective use of substrate materials because the launchers can be formed in an appropriate substrate material while the integrated circuit die 122 may be of a different material and the substrates and integrated circuit die 122 are retained together in the package 106.

Thus, to summarise, the system 100 comprises the waveguide assembly 102 comprising a plurality of waveguides. There are at least two waveguides comprising at least a first waveguide 104A and a second waveguide 104D, although in this embodiment four waveguides are provided.

The waveguide assembly, in the present example, comprises a single substrate wherein the plurality of waveguides comprise channels that extend through the substrate.

The first waveguide 104A is aligned with the launcher 108A of the integrated circuit package 106 for one or more of transmitting signalling and receiving signalling therebetween. The second waveguide 104D is aligned with the launcher 108D of the integrated circuit package 106 for one or more of transmitting signalling and receiving signalling therebetween.

Figure 2:
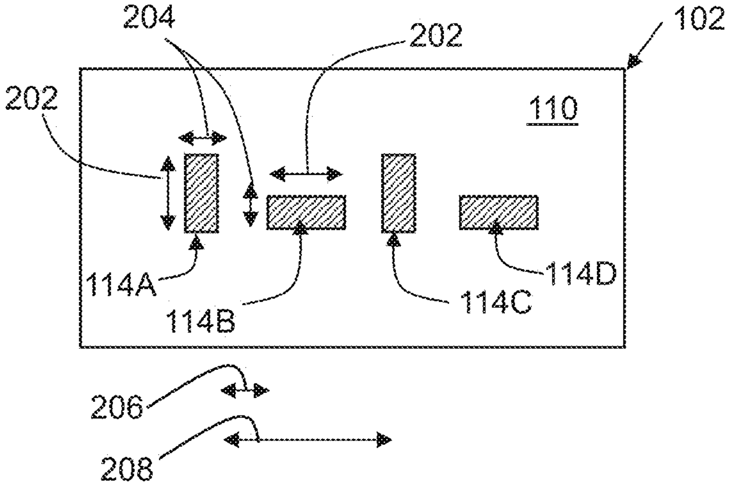
FIG. 2 shows a cross sectional plan view of the example embodiment of the waveguide assembly of the system along a line A-A of FIG. 1.
Figure 3:
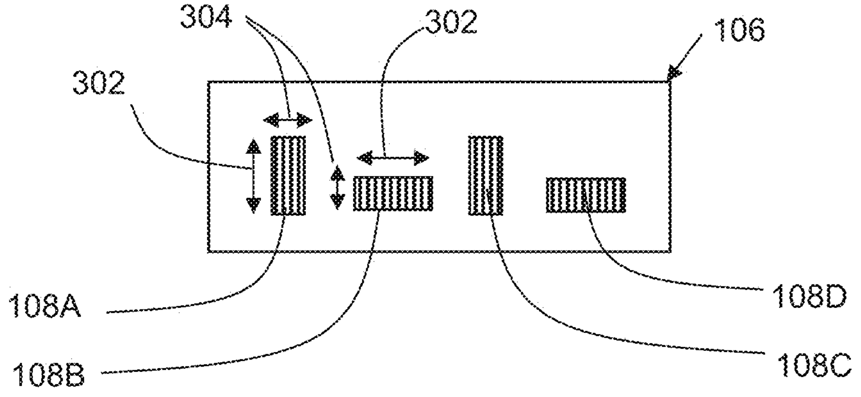
FIG. 3 shows a cross sectional plan view of the example embodiment of the integrated circuit package along line B-B of FIG. 1.

FIGS. 2 and 3 each show a cross section through the system 100 parallel to the surface 110 of the waveguide assembly 102 which is configured to couple to the IC package 106. In particular, FIG. 2 is a plan view of the waveguide assembly 102 along line A-A and looking down into the waveguide assembly 102 of FIG. 1 and shows the plurality of openings 114A-D. FIG. 3 is a plan view of the IC package 106 along line B-B and looking down through the IC package 106 towards the waveguide assembly 102 in FIG. 1 and shows the plurality of launchers 108A-D.

In the present example, the cross-sectional shape of the waveguides 104A-D may be configured to reduce interference between signalling conveyed in said waveguides. In particular, the waveguide assembly comprises a surface 110 configured to be coupled to a surface of the IC package so that the launchers 108A-D align with the respective waveguides 104A-D. Each of the plurality of waveguides comprise an opening 114A-D in the surface 110 configured to be aligned with its respective launcher.

Each of the openings 114A-D has a major dimension 202 and a minor dimension 204, wherein the major dimension is larger than the minor dimension. Thus, the openings are generally elongate.

The major dimension 202 of at least the opening 114A of the first waveguide 104A is oriented perpendicular to the major dimension 202 of the opening 114D of the second waveguide 104D. The orthogonal arrangement of the elongate waveguide openings may, in one or more examples, reduce interference between adjacent waveguides, which is advantageous.

The described embodiments may also allow for an increase in the number of waveguides (and therefore corresponding launchers in the package) for a given waveguide assembly 102 or allow the waveguide assembly to be further reduced in size for a given number of waveguides 104. This approach may also allow for more cost effective manufacturing by reducing the materials costs.

It will also be appreciated that the orthogonal arrangement provides for polarisation of adjacent communication channels thereby further reducing the amount of cross talk. Typically, the cross talk becomes more prominent as the separation between channels is decreased, whereas the use of the proposed arrangement can provide a reduced separation whilst maintaining an acceptable level of isolation. It will also be appreciated that in some arrangements, polarisation may be provided by the use of polarising antennas coupled to the output of the waveguide 104.

In one or more examples, the waveguide assembly 102 and the IC package 106 may include an interface layer 118 therebetween. Typically, the interface layer 118 is required to compensate for tolerances in manufacturing and positioning of the IC package 106 with respect to the waveguide assembly 102. Thus, the interface layer 118 allows for improved coupling between the launcher 108 in the IC package 106 and the respective waveguide 104 of the waveguide assembly 102. The improved coupling allows for improved RF performance, low insertion loss and better communication channel isolation.

The interface layer 118 in FIG. 1 may comprise one of a conductive material with openings that corresponding to each of the plurality of openings 114 in the plurality of waveguides 104, and an electromagnetic band-gap structure around each of the plurality of openings in the plurality of waveguides 104. It will be appreciated that the electromagnetic band-gap structure may comprise periodic structures around the waveguide openings 114A-D.

The launcher elements 502 may have an elongate shape that is complementary to the waveguide opening with which they are associated. Thus, in one or more examples, each of the plurality of launchers 108A-D has a major dimension 302 and a minor dimension 304, wherein the major dimension 302 is larger than the minor dimension 304, and wherein each launcher 108A-D and the opening 114A-D of its respective one of the plurality of waveguides is arranged such that the major dimension 202 of the opening is parallel to the major dimension 302 of the launcher.

In one or more examples, each of the plurality of launchers 108A-D comprises a differential patch launcher shown in FIGS. 5 to 7 below. The major dimension thus comprises a length 512 of the differential patch launcher and the minor dimension comprises a width 514 of the differential patch launcher.

Figure 8:
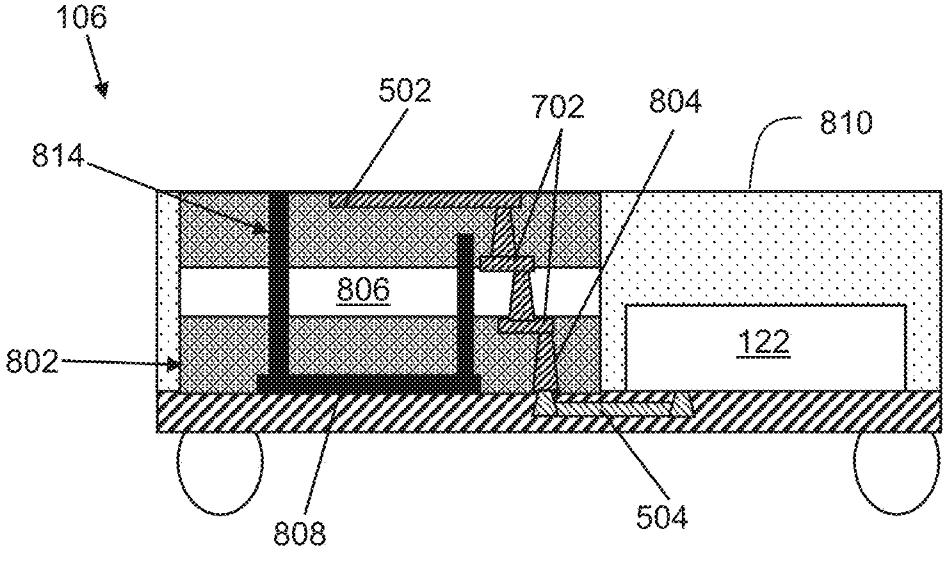
FIG. 8 shows a side view of the IC package showing the coupling between the IC die and the launcher according to an embodiment of the system.

With reference to FIG. 8, in one or more examples, each of the launchers 108A-D comprise a cavity 806 defined by side walls 814 and a ground plane 808 and a launcher element 502 located within the cavity 806. In some examples having this configuration, the major dimension may comprises a length of the cavity 302 and the minor dimension comprises a width 304 of the cavity.

The cross-section of the openings and, in one or more embodiments, the cross-section of the waveguides throughout the substrate of the waveguide assembly 102, is elongate. In a first example, each of the opening of the waveguides has a rectangular cross section, as shown in FIG. 2.

Figure 4:
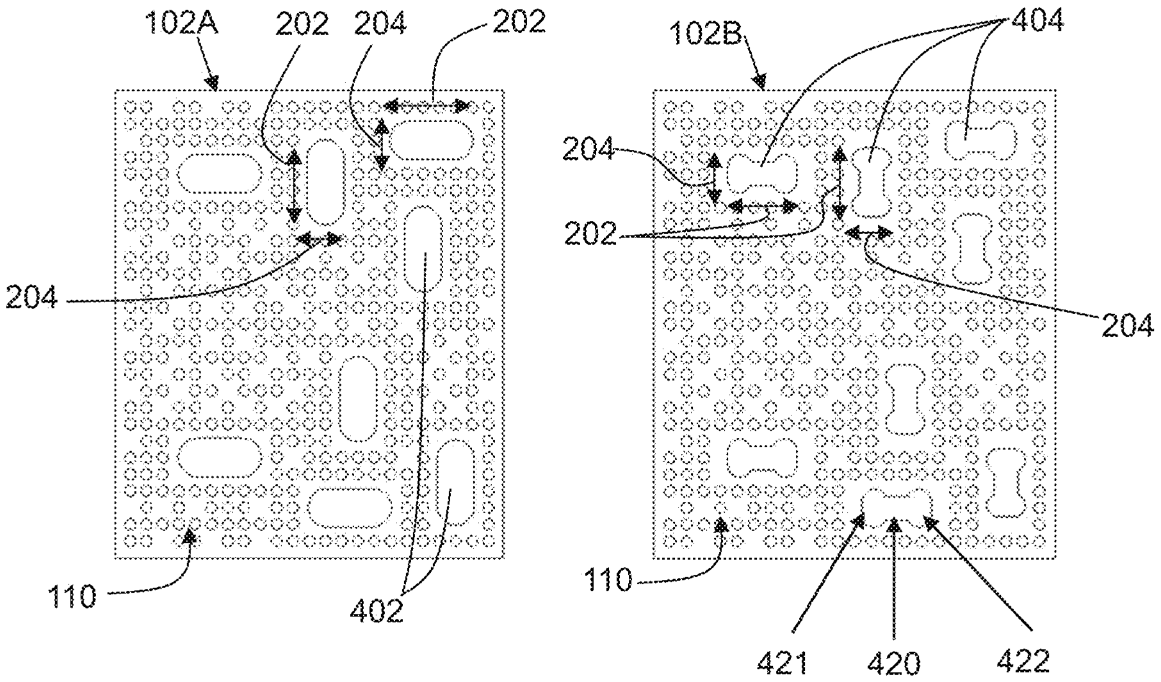
FIG. 4 shows a cross sectional plan view of two example waveguide assemblies comprising openings with different cross sectional shapes according to embodiments of the system.

In a second example, shown in FIG. 4, each of the opening of the waveguides has a rectangular cross section having rounded corners, as shown in substrate 102A of FIG. 2. It will be appreciated that openings which are rectangular with rounded ends 402 or rectangular with rounded corners (not shown) can allow for low cost waveguide assembly manufacturing by utilising simple manufacturing processes such as drilling. Forming square corners can be more challenging and therefore more costly. The use of rectangular openings with rounded ends 402, can therefore allow for more cost effective manufacture whilst maintaining the RF performance of the waveguides 104.

In a third example, each of the openings of the waveguides has an oval cross section (not shown in the figures).

In a fourth example, shown in substrate 102B of FIG. 4, each of the opening of the waveguides 404 has a dog-bone shaped cross section. It will be appreciated that the dog-bone shape will be known to those skilled in the art of waveguide design. However, it will be appreciated that the dog-bone shaped cross section comprises an elongate shape having parallel sides in a middle section 420 and at each end of the elongate shape, a second section 421 and 422 of greater width than the middle section. In general, the dog-bone shaped cross section is H-shaped.

In one or more examples, the first waveguide 104A is spaced apart from the second waveguide 104D by at least a first predetermined distance 116, comprising at least 1 mm for low cost in some embodiments. In some examples the first predetermined distance may be at least 0.9 mm or at least 0.8 mm. In other examples the spacing may be more than 1 mm or less than 0.8 mm.

In one or more examples, the IC package (i.e. the circuitry of the integrated circuit die 122) is configured to provide for transmission of signalling via the first waveguide 104A and receipt of signalling via the second waveguide 104D. It may be advantageous in some examples to arrange the "transmission" waveguides and the "receive" waveguides at opposite sides of the waveguide assembly 102. Thus, the first waveguide 104A and its respective launcher 108A and the second waveguide 104D and its respective launcher 108D are arranged on opposite sides of the waveguide assembly 102 and IC package 106 respectively.

The arrangement of the plurality of waveguides in the waveguide assembly may be provided to reduce interference between the signalling conveyed by adjacent waveguides. The arrangement of adjacent waveguides such that their major dimensions are orthogonal may also reduce interference. Thus, orthogonally arranged waveguides may be closer together than non-orthogonally arranged waveguides for a given tolerated interference level.

Thus, in one or more examples, the plurality of waveguides are configured such that:

- waveguides of the plurality of waveguides that are arranged with their major dimensions perpendicular to one another are spaced apart by a first minimum spacing 206; and
- waveguides of the plurality of waveguides that are arranged with their major dimensions parallel to one another are spaced apart by a second minimum spacing 208;
- wherein the first minimum spacing 206 is smaller than the second minimum spacing 208.

Figure 5:
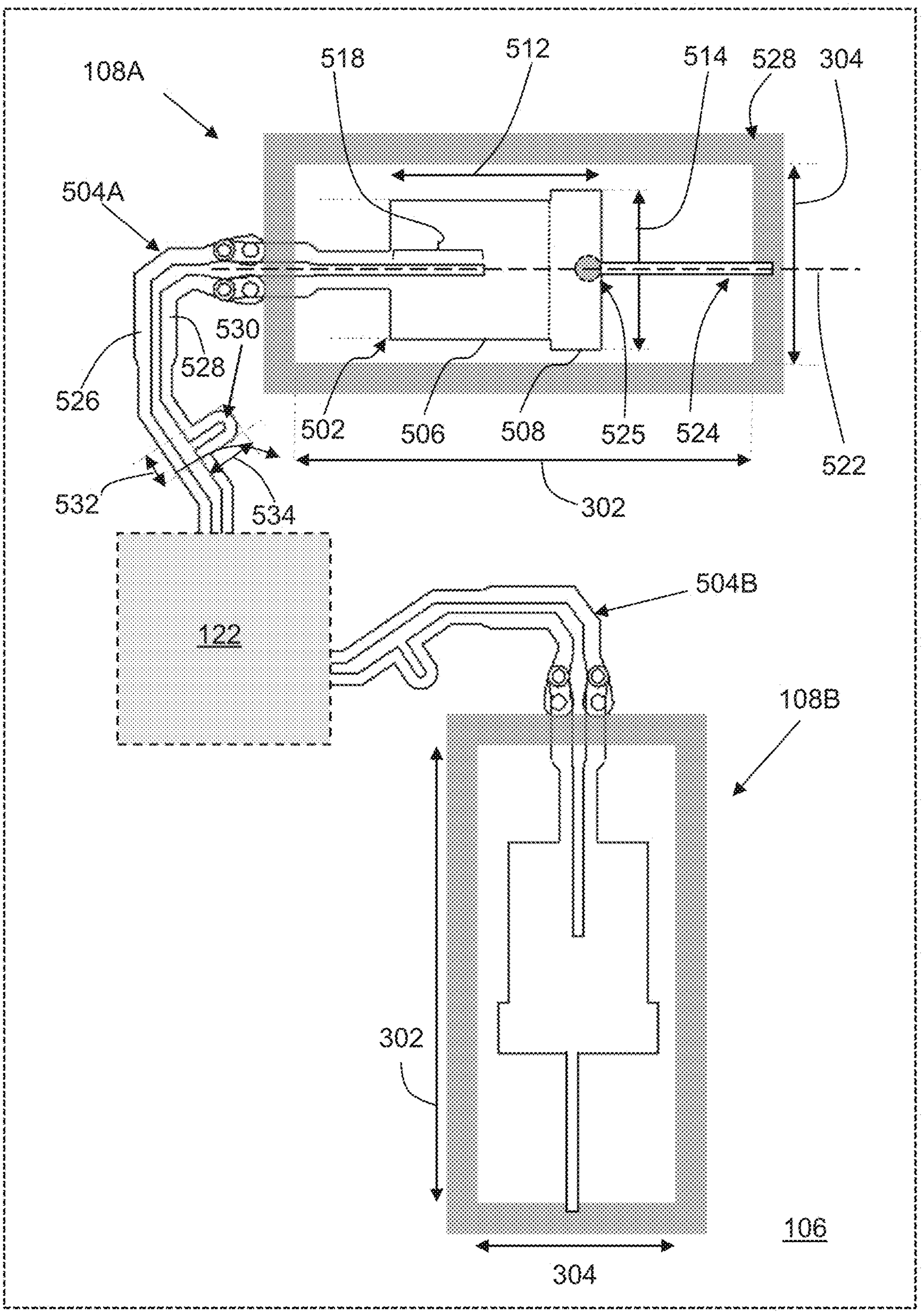
FIG. 5 shows a view of an IC package including two launchers in an orthogonal arrangement, each launcher being coupled to a different differential microstrip line, with at least one microstrip line including a compensation component according to an embodiment of the system.

With reference to FIG. 5, each of the launchers may comprise a differential patch launcher 502 comprising a planar body 506 and having a slot 518 therein extending from an outer edge along a line of symmetry 522 of the planar body. A differential microstrip line 504A, 504B comprising a first line 526 and a second line 528 are coupled to the planar body 506 at opposite sides of the slot 518. In one or more examples the length of the slot 518, which is the distance from the feed end of the differential patch launcher towards the centre of the differential patch launcher may be selected to control the impedance of the differential patch launcher 502.

It may be advantageous to detect electrical connection problems associated with the launchers within the package. In one or more examples, it has been found that electrical connection problems may disrupt the current distribution within the differential patch launcher. Therefore, a comparison of the current in the differential patch launcher relative to a threshold may be indicative of an electrical connection problem somewhere in the package.

In one or more examples, the differential patch launcher is shaped such that a predetermined location on the differential patch launcher is at ground potential when in use. In the example of FIG. 5, the predetermined location 525 is along the line of symmetry 522 opposite the slot 518. Thus, in this example, the system may comprise a detector (not shown) coupled to said differential patch launcher at the predetermined location 525 by connection 524. The connection 524 is coupled to ground. As the predetermined location 525 is at a virtual ground and the connection 524 is also coupled to ground, no current should flow through the connection 524. The detector is configured to detect current flow in said connection 524 and, based on detection of said current flow, provide a signal. This signal may be considered indicative of an electrical connection fault.

Figure 6:
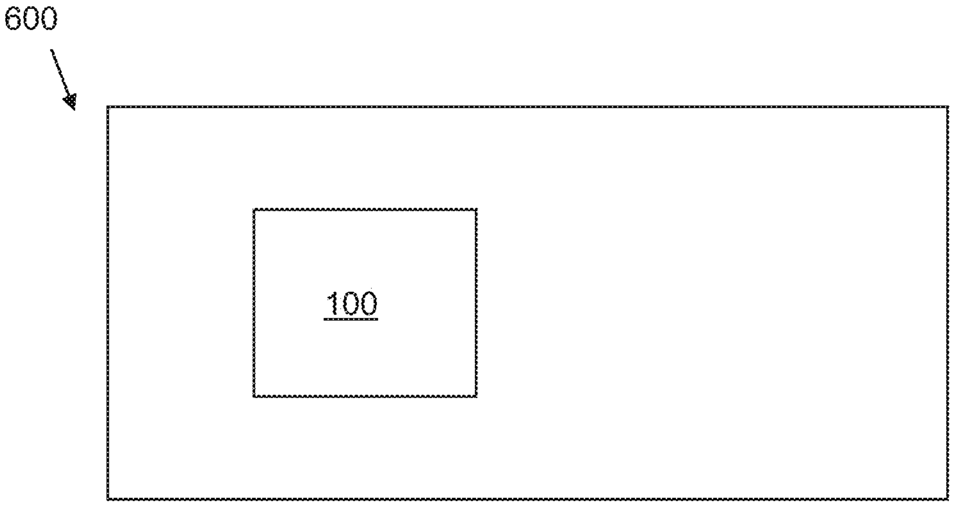
FIG. 6 shows an electronic device.

Example FIG. 6 shows an electronic device 600 comprising, for example, one of a telecommunication radio interface and a radar system, including the system 100.

Additional features of the disclosure will now be described.

In some examples the first waveguide is configured to convey a first communication channel and the second waveguide is configured to convey a second communication channel. In some examples of the system 100, the level of isolation required between channels differs based on the type of communication channel. For example, different levels of isolation may be required based on whether the first and second communication channels are either both transmit channels, or where they are both receive channels or whether they are a mix of one transmit and one receive channel.

In one or more examples, the first predetermined distance 116 between any two waveguides 104 of any two transmit channels or any two receive channels may correspond to a distance configured to provide an isolation of at least 35 dB between the two communication channels.

In a further example, where the two communication channels comprise one transmit channel and one receive channel, the first predetermined distance 116 between the waveguides 104 of the transmit channel and the receive channel may correspond to a distance configured to provide an isolation of at least 45 dB.

It will be appreciated that the isolation value may also be set based on the type of information being transmitted and as such the isolation between the channels may be higher than 35 dB or lower than 35 dB for the TX-TX or RX-RX arrangements and may be higher than 45 dB or lower than 45 dB for a TX-RX, RX-TX or TRX-TRX arrangement. In particular, uncoded or otherwise “simple information” that is more prone to errors during transmission may require a higher level of isolation whereas coded or data that is otherwise capable of being corrected may require lower levels of isolation.

It will be appreciated that the openings 114 may be the same cross sectional size and shape as the waveguide 104. In other examples, the openings 114A-D may be the same size or shape as the launcher 108A-D cross section.

In some examples, it will be appreciated that the level of isolation may be achieved without requiring the major dimension 202 of the first opening 114A and the major dimension 202 of the second opening 114B to be exactly 90 degrees to one another. In some examples an angle between the major dimensions greater than 45 degrees may be sufficient.

FIG. 5 further shows an arrangement of two launchers 108A, 108B within the IC package 106. The example of FIG. 5 includes a launcher element 502 that may be fed by a differential microstrip line 504A. In the example of FIG. 5, the major dimension 302 of the first launcher 108A is oriented perpendicular to the major dimension 302 of the second launcher 108B (it should be noted that the features in the second launcher 108B of FIG. 5 are equivalent to those of the first launcher 108A and so have not been labelled).

In some examples, the differential microstrip lines may need to turn through 90 degrees to enable one launcher to be orthogonal to another launcher. The routing of the microstrip lines may cause one microstrip line 528 to have a shorter electrical length than the other microstrip line 526. Thus, in one or more examples, one or more of the lines of the microstrip line 504 may include one or more phase delay components 530 comprising a balun coupled to the microstrip line 504 to maintain the required phase difference. In other examples, the one or more baluns may be configured to ensure that the microstrip line 504 operates such that the differential mode is dominant with respect to the common mode. In one or more examples the balun component may be used to maintain the field that is present at the beginning of the microstrip line (i.e., from the differential output at the output of the IC die 122) through to the end of the microstrip line (i.e. just prior to coupling to the launcher 502). In one or more examples the use of the balun component may ensure that a symmetrical field and current distribution is maintained about the line of symmetry 522 of the launcher 502. Thus, it is the use of the balun which maintains the differential input signal that allows for the virtual ground 525 on the launcher 502 to be established. This is due to the resulting symmetric field and current distribution that is set up in the launcher.

It will be appreciated that the balun component may only be required when the microstrip line 504 is rotated about 90 degrees from the output of the IC die 122 to the input to the launcher 502. When the output of the IC die 122 is parallel to the input of the launcher 502, a balun may not be required.

FIG. 5 further shows that the differential patch launcher 502 comprises a first rectangular section arranged adjacent to a second rectangular section 508. The first and second rectangular sections may be configured to form a truncated T shape patch launcher 502. In some examples, the lengths and widths of the first and second rectangular sections of the differential patch launcher 502 may allow for improved impedance matching and improved waveguide coupling between the launcher 108 and the waveguide 104.

Figure 7:
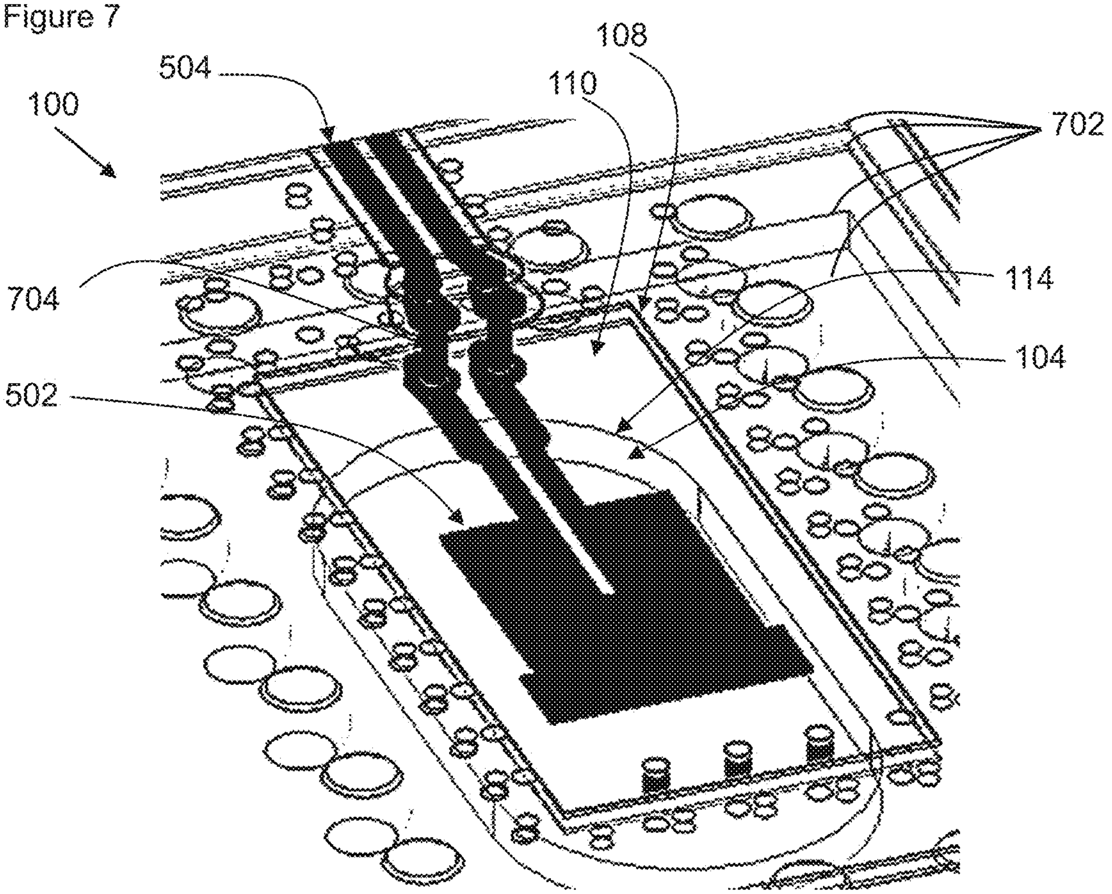
FIG. 7 shows an isometric view of a launcher according to an embodiment of the system indicating the relative arrangement of a launcher and an opening in the waveguide assembly.

FIG. 7 shows a detailed view of the system 100 and in particular shows the launcher 108 comprising a radiating element 502. FIG. 7 also shows the radiating element 502 positioned over the opening 114 in the surface 110 of the waveguide assembly 102. Furthermore, the differential microstrip line 504 is shown as being coupled to the radiating element 502 using vias 704 and through a plurality of layers 702 within the IC package 106.

FIG. 8 shows a simplified side cross section of the IC package 106. In one or more examples the IC package 106 may comprise at least one integrated circuit die 122. The package 106 may further comprise a substrate 802 in which the launcher is formed. In some examples each launcher element 502 of the plurality of launchers 108 is coupled to the IC die 122 using a plurality of vias 120, 704, 804 that pass through the plurality of metal layers in the IC die 122, substrate 802 and substrate.

In some examples, the IC package 106 of the system 100 may also comprise one of a bottom coupling flip-chip-chip-scale-package platform (FC-CSP); a top coupling flip-chip-chip-scale-package possum platform; and top or bottom coupling fan-out-wafer-level-package (FO-WLP). It will be appreciated that a FC-CSP (die on top or die on bottom, "possum") launcher substrate may be solder bumped and soldered to a substrate alongside an RF die 122 and interconnected through the FC substrate. Furthermore, it will be appreciated that a FO-WLP (e.g., eWLB) launcher substrate may be embedded within the IC package 106 alongside the IC die 122 and interconnected by a redistribution layer. Both FO-WLP and FC-CSP may allow the use of an area array die and therefore allow the use of a high I/O die which may have a small form factor and thus requires improved channel isolation.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system comprising:

a waveguide assembly comprising a plurality of waveguides, the plurality of waveguides comprising at least a first waveguide and a second waveguide, and an integrated circuit package, IC package, comprising a plurality of launchers to one or more of transmit signalling to and receive signalling from a respective one of the plurality of waveguides, wherein the waveguide assembly comprises a surface configured to be located adjacent the IC package and wherein each of the plurality of waveguides comprise an opening in the surface configured to be aligned with its respective launcher, wherein each of the openings has a major dimension and a minor dimension, wherein the major dimension is larger than the minor dimension, wherein the major dimension of at least the opening of the first waveguide is oriented perpendicular to the major dimension of the opening of the second waveguide, wherein each of the launchers comprises a differential patch launcher comprising a planar body having a slot therein extending from an outer edge along a line of symmetry of the planar body, wherein a differential microstrip line comprising a first line and a second line is coupled to the planar body at opposite sides of the slot, and wherein at least one of the first line or the second line of the microstrip line comprises a compensation component configured to provide for common mode reduction.

2. The system of claim 1, wherein each of the plurality of launchers has a major dimension and a minor dimension, wherein the major dimension is larger than the minor dimension, and wherein each launcher and the opening of its respective one of the plurality of waveguides is arranged such that the major dimension of the opening is parallel to the major dimension of the launcher.

3. The system of claim 2, wherein each of the plurality of launchers comprises a differential patch launcher and the major dimension comprises a length of the differential patch launcher and the minor dimension comprises a width of the differential patch launcher.

4. The system of claim 1, wherein each opening of the first waveguide and the second waveguide has a rectangular cross section.

5. The system of claim 1, wherein each opening of the first waveguide and the second waveguide has a rectangular cross section having rounded corners.

6. The system of claim 1, wherein each opening of the first waveguide and the second waveguide has a dog-bone shaped cross section.

7. The system of claim 1, wherein the first waveguide is spaced apart from the second waveguide by at least a first predetermined distance comprising at least 1 mm.

8. The system of claim 1, wherein the waveguide assembly comprises a substrate wherein the plurality of waveguides comprise channels that extend through the substrate.

9. The system of claim 1, wherein the IC package is configured to provide for transmission of signalling via the first waveguide and receipt of signalling via the second waveguide, and wherein the first waveguide and its respective launcher and the second waveguide and its respective launcher are arranged on opposite sides of the waveguide assembly and IC package respectively.

10. The system of claim 1, wherein the plurality of waveguides are configured such that:

waveguides of the plurality of waveguides that are arranged with their major dimensions perpendicular to one another are spaced apart by a first minimum spacing; and waveguides of the plurality of waveguides that are arranged with their major dimensions parallel to one another are spaced apart by a second minimum spacing;

wherein the first minimum spacing is smaller than the second minimum spacing.

11. The system of claim 1, wherein the differential patch launcher is shaped such that a predetermined location on the differential patch launcher is at ground potential when in use and wherein the system comprises a detector coupled to said differential patch launcher at the predetermined location, wherein the detector is configured to detect current flow in said connection and, based on detection of said current flow, provide a signal.

12. The system of claim 1 wherein the system includes an interface layer configured to extend between the surface of the waveguide assembly and the IC package, wherein the interface layer comprises one of:

a conductive material with openings corresponding to each of the plurality of openings in the plurality of waveguides, and an electromagnetic band-gap structure around each of the plurality of openings in the plurality of waveguides.

13. An electronic device comprising one of a telecommunication radio interface and a radar system, including the system of claim 1.

14. The system of claim 1, wherein each opening of the first waveguide and the second waveguide has a dog-bone shaped cross section.

15. The system of claim 1, wherein the dog-bone shaped cross section comprises an elongate shape having parallel sides in a middle section and at each end of the elongate shape a second section of greater width than the middle section.

16. The system of claim 1, wherein said IC package comprises one of: a bottom coupling flip-chip-chip-scale-package platform, FC-CSP; a top coupling flip-chip-chip-scale-package possum platform; and top or bottom coupling fan-out-wafer-level-package, FO-WLP.

17. The system of claim 12, wherein the microstrip line is rotated about 90 degrees from an output of the IC die to the input to the launcher.

18. The system of claim 13, wherein the compensation component is a balun.

* * * * *